(12) United States Patent
Lee et al.

(10) Patent No.: US 8,327,058 B2
(45) Date of Patent: Dec. 4, 2012

(54) METHOD AND SYSTEM FOR ROUTING DATA IN A PARALLEL TURBO DECODER

(75) Inventors: Tak (Tony) Lee, Irvine, CA (US);
Bazhong Shen, Irvine, CA (US)

(73) Assignee: Broadcom Corporation, Irvine, CA (US)

(*) Notice: Subject to any disclaimer, the term of this patent is extended or adjusted under 35 U.S.C. 154(b) by 1166 days.

(21) Appl. No.: 12/180,205

(22) Filed: Jul. 25, 2008

(65) Prior Publication Data
US 2010/0023670 A1    Jan. 28, 2010

(51) Int. Cl.
*G06F 12/00* (2006.01)
*H03M 13/00* (2006.01)
*G11C 20/00* (2006.01)

(52) U.S. Cl. .............. 711/5; 711/E12.001; 714/763; 714/752; 714/755; 714/795

(58) Field of Classification Search ....... 711/5, E12.001; 714/752, 755, 795, 763
See application file for complete search history.

(56) References Cited

U.S. PATENT DOCUMENTS

| | | | | |
|---|---|---|---|---|
| 6,516,437 B1* | 2/2003 | Van Stralen et al. | .......... | 714/755 |
| 7,127,656 B2* | 10/2006 | Van Stralen et al. | .......... | 714/755 |
| 7,783,952 B2* | 8/2010 | Nimbalker et al. | .......... | 714/795 |
| 2005/0149838 A1* | 7/2005 | Chiueh et al. | ........... | 714/795 |
| 2007/0234180 A1* | 10/2007 | Edmonston et al. | .......... | 714/759 |
| 2008/0115033 A1* | 5/2008 | Lee et al. | ........ | 714/755 |
| 2008/0222372 A1* | 9/2008 | Shtalrid | ........ | 711/157 |
| 2009/0049360 A1* | 2/2009 | Shen et al. | ........... | 714/752 |

* cited by examiner

*Primary Examiner* — Yaima Campos
*Assistant Examiner* — Mehdi Namazi
(74) *Attorney, Agent, or Firm* — Thomas | Horstemeyer, LLP

(57) ABSTRACT

Described herein are system(s) and method(s) for routing data in a parallel Turbo decoder. Aspects of the present invention address the need for reducing the physical circuit area, power consumption, and/or latency of parallel Turbo decoders. According to certain aspects of the present invention, address routing-networks may be eliminated, thereby reducing circuit area and power consumption. According to other aspects of the present invention, address generation may be moved from the processors to dedicated address generation modules, thereby decreasing connectivity overhead and latency.

12 Claims, 4 Drawing Sheets

METHOD AND SYSTEM FOR ROUTING DATA IN A PARALLEL TURBO DECODER

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Turbo codes are a class of high-performance error correction codes that were first described by Berrou, Glavieux, and Thitimajshima in their 1993 paper: "Near Shannon Limit error-correcting coding and decoding: Turbo-codes" published in the Proceedings of IEEE International Communications Conference in 1993. Turbo codes may be used to maximize the information transfer rate over a limited-bandwidth communication link in the presence of data-corrupting noise. Limitations and disadvantages of Turbo codes may include a relatively high decoding complexity and a relatively high latency.

Limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

Described herein are system(s) and method(s) for routing data in a parallel Turbo decoder, substantially as shown in and/or described in connection with at least one of the figures, as set forth more completely in the claims.

These and other advantages and novel features of the present invention will be more fully understood from the following description.

DETAILED DESCRIPTION OF THE INVENTION

Turbo codes may be used to communicate data between battery powered wireless consumer devices. Wireless communication devices such as phones and PDAs may be rated by their speed, cost and battery life. Accordingly, there is a need for reducing the physical size, power consumption and latency of circuits that perform Turbo decoding within these devices. Aspects of the present invention address the need for reducing the physical circuit area, power consumption and/or latency in a parallel Turbo decoding architecture.

Address routing networks in a parallel Turbo decoder may affect the overall size, speed and power consumption of an integrated circuit that performs parallel Turbo decoding. According to certain aspects of the present invention, address routing networks may be eliminated, thereby reducing circuit area and power consumption. According to other aspects of the present invention, address generation may be moved from processors to dedicated address generation modules, thereby decreasing connectivity overhead and latency.

Figure 1:
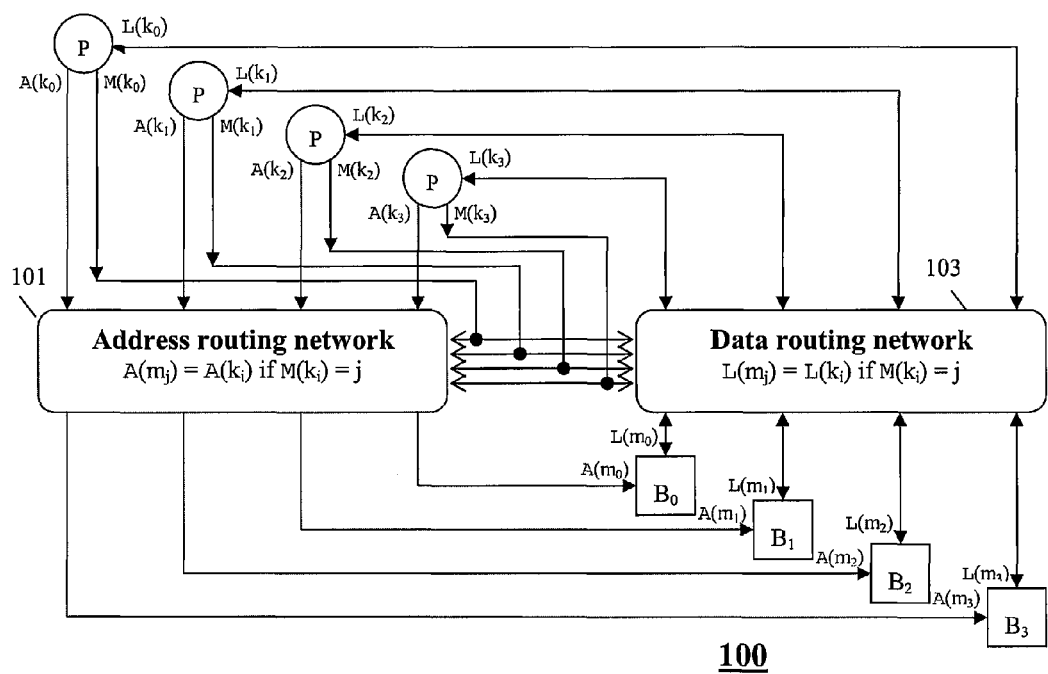
FIG. 1 is a diagram that illustrates a system for routing data in a parallel Turbo decoder in accordance with an embodiment of the present invention.

FIG. 1 is a diagram that illustrates a system for routing data in a parallel Turbo decoder (100) in accordance with an embodiment of the present invention. The system for routing data in a parallel Turbo decoder (100) consists of N processor ($P_0, P_1, \ldots P_{N-1}$); M memory banks ($B_0, B_1, \ldots B_{M-1}$); an address routing-network (101); and a data routing-network (103). The system for routing data in a parallel Turbo decoder (100) is illustrated with N=4 and M=4.

Each of the processors ($P_0, P_1, P_2, P_3$,) may decode a segment of a turbo codeword. Each of the memory banks ($B_0, B_1, B_2, B_3$) may store values that correspond to data items at multiple positions within the turbo codeword. These values may be used by the processors to perform turbo decoding.

The address routing-network (101) may be used by the processors to calculate memory addresses, which correspond to the memory banks. The data routing-network (103) may be used to transfer data between the processors and the memory banks.

Figure 2:
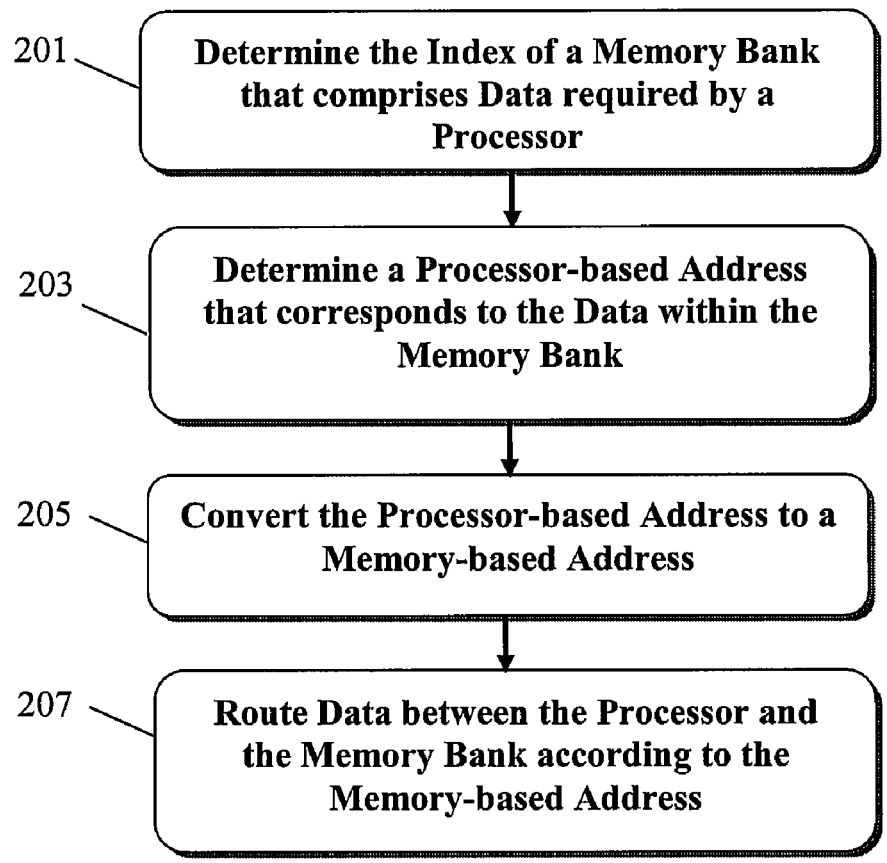
FIG. 2 is a flow diagram that illustrates a method for routing data in a parallel Turbo decoder in accordance with an embodiment of the present invention.

Data routing, in FIG. 1, may comprise the steps that are illustrated in FIG. 2. Each processor $P_i$ may be required to operate on the data item at position $k_i$. The index of the memory bank that comprises that data item is determined at 201. Each of the N processors {i: $0 \leq i < N : P_i$} may compute the number of the memory bank, $j=M(k_i)$, that contains the storage for the data item at position $k_i$.

A processor-based address that corresponds to the data within the memory bank, $B_j$, may be determined at 203. Each processor $P_i$ may compute the address, $A(k_i)$, within $B_j$, that corresponds to the storage for the data item at position $k_i$.

At 205, the processor-based address may be converted to a memory-based address. The set of addresses {i: $0 \leq i < N$: $A(k_i)$} for the N processors may be routed to the set of addresses {j: $0 \leq j < M$: $A(m_j)$} for the memory banks, using the address routing-network (101). The address routing-network (101) may convert the addresses from being a function of the processor number (i) to being a function of the memory bank number (j). For example, address, $A(k_i)$, is mapped to address, $A(m_j)$, where $j=M(k_i)$.

At 207, data may be routed between the processor and the corresponding memory bank according to the memory-based address. Using the value of $A(m_j)$ as the address, each memory bank $B_j$ may access the storage for the data item at position $k_i$, where $j=M(k_i)$. The set of data items {i:$0 \leq i < N$: $L(k_i)$} for the processors may be routed back and forth as the set of data items {j: $0 \leq j < M$: $L(m_j)$} accessed by the memory banks, using the data routing-network (103). The data routing-network (103) may convert the data items from being a function of the memory bank number (j) to being a function of the processor number (i); or vise versa, i.e. from being a function of the processor number (i) to being a function of the memory bank number (j). For example, data item, $L(k_i)$, is mapped to data item, $L(m_j)$, where $j=M(k_i)$.

Figure 3:
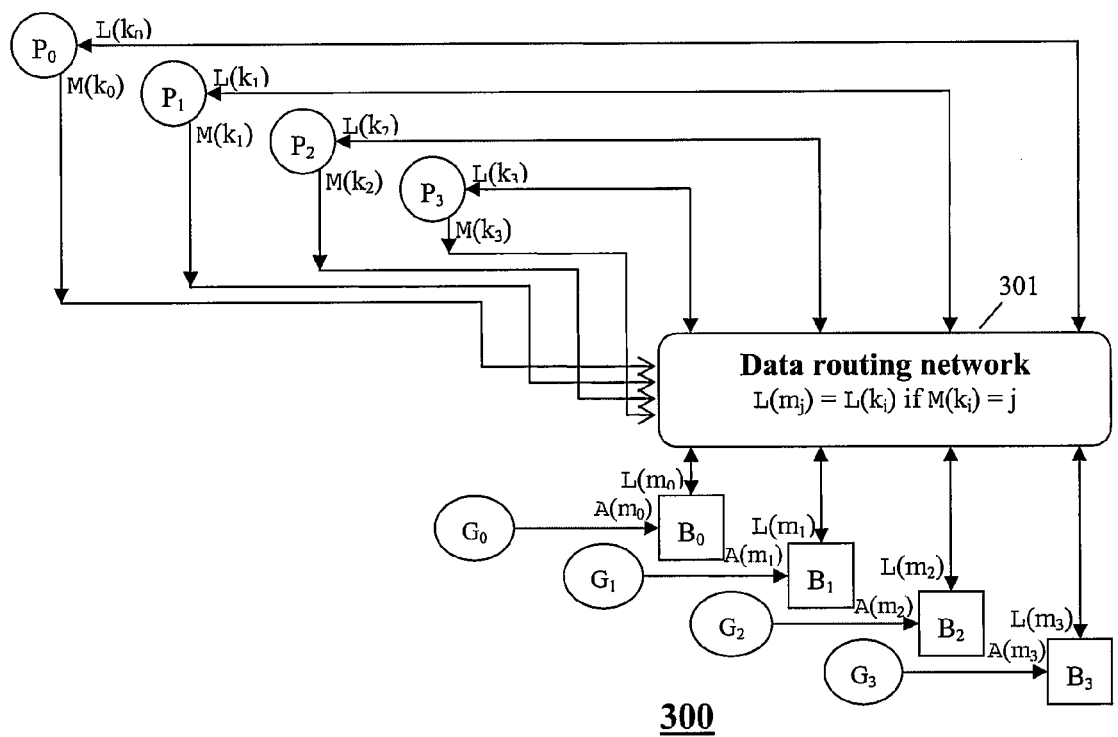
FIG. 3 is a diagram that illustrates an improved system for routing data in a parallel Turbo decoder in accordance with an embodiment of the present invention.

FIG. 3 is a diagram that illustrates an improved system for routing data in a parallel Turbo decoder (300) in accordance with an embodiment of the present invention. The system for routing data in a parallel Turbo decoder (300) consists of N processor ($P_0, P_1, \ldots P_{N-1}$); M memory banks ($B_0, B_1, \ldots B_{M-1}$); M address generation modules ($G_0, G_1, \ldots G_{M-1}$); and a data routing-network (301). The improved system for routing data in a parallel Turbo decoder is illustrated with N=4 and M=4.

The system for routing data in a parallel Turbo decoder (300) of FIG. 3 may eliminate the need for the address routing-network (101) of FIG. 1 by introducing the address generation modules. Address generation module $G_j$ {j: $0 \leq j < M$} may be dedicated to generating the address values for memory bank $B_j$.

Figure 4:
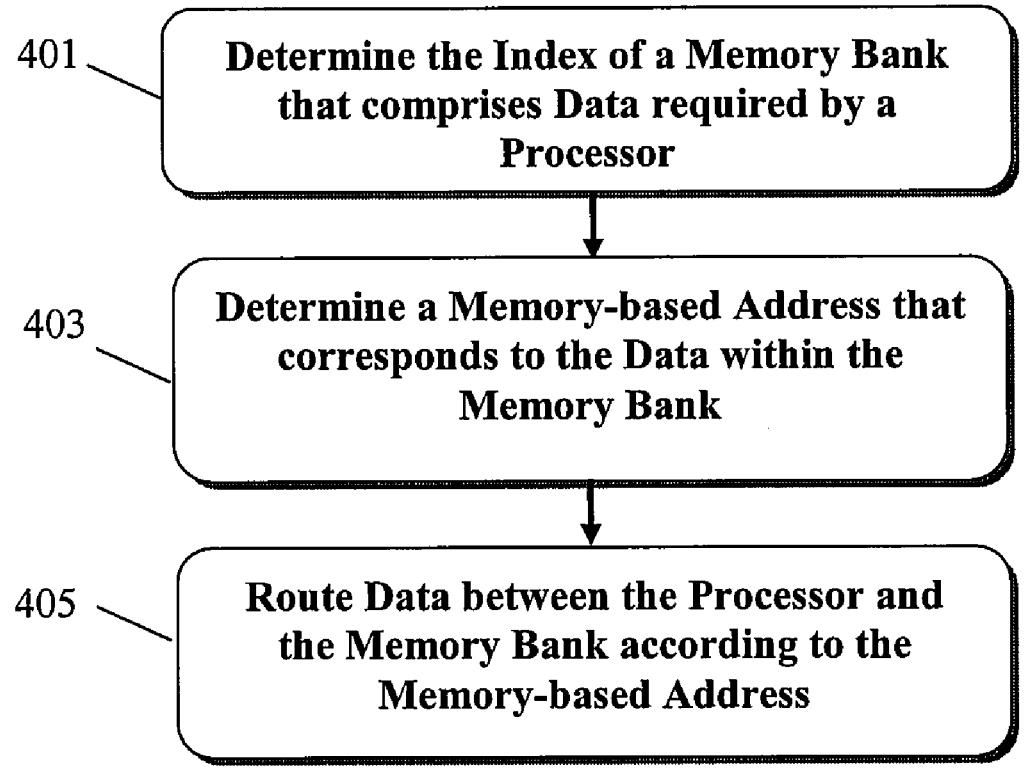
FIG. 4 is a flow diagram that illustrates an improved method for routing data in a parallel Turbo decoder in accordance with an embodiment of the present invention.

Data routing, in FIG. 3, may comprise the steps that are illustrated in FIG. 4. Each of the N processors {i: $0 \leq i < N$: $P_i$} operates on the data item at position $k_i$. The index of the memory bank that comprises that data item is determined at 401. Each processor $P_i$ may compute the number of the memory bank, $j=M(k_i)$, that contains the storage for the data item at position $k_i$.

A memory-based address that corresponds to the data within the memory bank, $B_j$, may be determined at 403. Each address generation module, $G_j$, may compute $A(m_j)$, the address for bank $B_j$, such that $A(m_j)=A(k_i)$, if $j=M(k_i)$.

At 405, data may be routed between the processor and the corresponding memory bank according to the memory-based address. Using the value of $A(m_j)$ as the address, each memory bank $B_j$ may access the storage for the data item at position $k_i$, where $j=M(k_i)$. The set of data values {$i:0 \leq i<N$: $L(k_i)$} for the processors may be routed back and forth as the set of data values {$j: 0 \leq j < M$: $L(m_j)$} accessed by the memory banks, using the data routing-network (301). The data routing-network (301) may convert the data items from being a function of the memory bank number (j) to being a function of the processor number (i); or vise versa, i.e. from being a function of the processor number (i) to being a function of the memory bank number (j). For example, data item, $L(k_i)$, is mapped to data item, $L(m_j)$, where $j=M(k_i)$.

In FIG. 3, each address generation module $G_j$ may compute $A(m_j)$, such that $j=M(k_i)$ for some $k_i$. $A(m_j)$ may be a function of the index of the memory bank (j) and the step number in the decoding process. The actual computation performed by $G_j$ may depend on an interleaver function of the turbo code $\pi$, the memory-mapping function M, and the address function A.

The arrangement of the input to the interleaver is considered a natural-order, and the arrangement of the output from the interleaver is considered an interleaved-order. In step t of a natural-order phase, processor $P_i$ may process the data item at position t+Wi. In step t of an interleaved-order phase, processor $P_i$ may process the data item at position $\pi$(t+Wi). Also, $A_N(j,t)$ denotes the value of $A(m_j)$ at step t of the natural-order phase, and $A_I(j,t)$ denote the value of $A(m_j)$ at step t of the interleaved-order phase.

The computation performed by $G_j$ depends on the interleaver function ($\pi$), the memory-mapping function (M), and the address function (A). The interleaver may be divided into sub-blocks of size W, and interleaver positions may be designated as k. In a first exemplary case, the memory-mapping function (M) is a DIV operation and the address function (A) is a MOD function as follows:

$$M(k)=\lfloor k/W \rfloor \qquad \text{EQ. 1}$$

$$A(k)=(k \bmod W) \qquad \text{EQ. 2}$$

In this first exemplary case, the computations performed by $G_j$ are as follows:

$$A_N(j,t)=t \qquad \text{EQ. 3}$$

$$A_I(j,t)=\pi(t) \qquad \text{EQ. 4}$$

In a second exemplary case, the memory-mapping function (M) is a MOD operation and the address function (A) is a MOD function as follows:

$$M(k)=(k \bmod N) \qquad \text{EQ. 5}$$

$$A(k)=(k \bmod W) \qquad \text{EQ. 6}$$

A quadratic permutation polynomial (QPP) is an example of one type of interleaver function. In this second exemplary case, the following QPP interleaver function of length L=24 is used:

$$\pi(x)=(x+6x^2) \bmod 24 \qquad \text{EQ. 7}$$

This QPP interleaver function may be associated with an interleaver that contains 3 sub-blocks of size W=8 and system parameters of N=3 and M=3. The computations performed by $G_j$ in this second exemplary case are as follows:

$$A_N(j,t)=t \qquad \text{EQ. 8}$$

$$A_I(j,t)=(\pi((16j+9t) \bmod 24) \bmod W) \qquad \text{EQ. 9}$$

While the present invention has been described with reference to certain embodiments, it will be understood by those skilled in the art that various changes may be made and equivalents may be substituted without departing from the scope of the present invention.

Additionally, many modifications may be made to adapt a particular situation or material to the teachings of the present invention without departing from its scope. For example, although the invention has been described with a particular emphasis on a hardware circuit design, the invention may also be applied to a software design in a wide variety of languages.

Therefore, it is intended that the present invention not be limited to the particular embodiment disclosed, but that the present invention will include all embodiments falling within the scope of the appended claims.

The invention claimed is:

1. A method for routing data in a parallel Turbo decoder, wherein the parallel Turbo decoder comprises a plurality of processors and a plurality of memory banks, said method comprising:
   associating a memory bank with a processor;
   addressing a data item; and
   routing the addressed data item between the associated memory bank and the processor,
   wherein the processor is associated with the memory bank that is indexed according to a function of a position of the data item,
   wherein a memory bank index is the position of the data item divided by a length of an interleaver sub-block, wherein any remainder of the division is disregarded,
   wherein the data item is addressed according to a function of the position of the data item,
   wherein a data item address is the remainder of the division of the position of the data item by the length of the interleaver sub-block.

2. The method of claim 1, wherein the processor determines an index of the associated memory bank.

3. The method of claim 1, wherein an address generation module addresses the data item within the associated memory bank.

4. The method of claim 1, wherein a data routing network routes the addressed data item between the associated memory bank and the processor.

5. The method of claim 4, wherein the data routing network coordinates the association of the data item with the processor.

6. A method for routing data in a parallel Turbo decoder, wherein the parallel Turbo decoder comprises a plurality of processors and a plurality of memory banks, said method comprising:

associating a memory bank with a processor;
addressing a data item; and
routing the addressed data item between the associated memory bank and the processor,
wherein the processor is associated with the memory bank that is indexed according to a function of a data item position,
wherein a memory bank index is a remainder of a division of the data item position by a number of processors in the plurality of processors, wherein the data item is addressed according to a function of the position of the data item,
wherein a data item address is the remainder of the division of the position of the data item by the length of the interleaver sub-block.

7. A system for routing data in a parallel Turbo decoder, said system comprising:

a plurality of processors;
a plurality of memory banks, wherein, at a point in a decoding process, a memory bank in the plurality of memory banks is associated with a processor in the plurality of processors;
a plurality of address generation modules, wherein an address generation module addresses a data item; and
a data routing network for routing the addressed data item from the associated memory bank to the processor,
wherein the processor is associated with the memory bank that is indexed according to a function of a position of the data item,
wherein a memory bank index is the position of the data item divided by a length of an interleaver sub-block, wherein any remainder of the division is disregarded,
wherein the data item is addressed according to a function of the position of the data item,
wherein a data item address is the remainder of the division of the position of the data item by the length of the interleaver sub-block.

8. The system of claim 7, wherein the processor determines the index of the associated memory bank.

9. The system of claim 7, wherein each address generation module in the plurality of address generation modules is connected to one of the memory banks in the plurality of memory banks.

10. The system of claim 7, wherein the data routing network routes the addressed data item to the associated memory bank from the processor.

11. The system of claim 10, wherein the data routing network coordinates the association of the data item with the processor.

12. A system for routing data in a parallel Turbo decoder, said system comprising:

a plurality of processors;
a plurality of memory banks, wherein, at a point in a decoding process, a memory bank in the plurality of memory banks is associated with a processor in the plurality of processors;
a plurality of address generation modules, wherein an address generation module addresses a data item; and
a data routing network for routing the addressed data item from the associated memory bank to the processor,
wherein the processor is associated with the memory bank that is indexed according to a function of a position of the data item,
wherein a memory bank index is a remainder of a division of the data item a number of processors in the plurality of processors,
wherein the data item is addressed according to a function of the position of the data item,
wherein a data item address is the remainder of the division of the position of the data item by the length of the interleaver sub-block.

* * * * *